United States Patent
Kozu et al.

(10) Patent No.: US 8,481,229 B2
(45) Date of Patent: Jul. 9, 2013

(54) FUEL CELL STACK AND FUEL CELL USING THE SAME

(75) Inventors: Katsumi Kozu, Hyogo (JP); Shinsuke Fukuda, Osaka (JP)

(73) Assignee: Panasonic Corporation (JP)

( * ) Notice: Subject to any disclaimer, the term of this patent is extended or adjusted under 35 U.S.C. 154(b) by 726 days.

(21) Appl. No.: 12/664,171

(22) PCT Filed: Jun. 12, 2008

(86) PCT No.: PCT/JP2008/001497
§ 371 (c)(1),
(2), (4) Date: Dec. 11, 2009

(87) PCT Pub. No.: WO2008/155884
PCT Pub. Date: Dec. 24, 2008

(65) Prior Publication Data
US 2010/0173218 A1    Jul. 8, 2010

(30) Foreign Application Priority Data
Jun. 18, 2007  (JP) ................. 2007-159796

(51) Int. Cl.
*H01M 2/08* (2006.01)
*H01M 2/14* (2006.01)
*H01M 8/24* (2006.01)

(52) U.S. Cl.
USPC ............ 429/511; 429/452; 429/507; 429/508

(58) Field of Classification Search
USPC ................. 429/511, 508, 507, 452
See application file for complete search history.

(56) References Cited

U.S. PATENT DOCUMENTS

| | | | |
|---|---|---|---|
| 5,543,241 A | 8/1996 | Nishioka et al. | |
| 5,686,200 A * | 11/1997 | Barton et al. | 429/511 |
| 6,210,823 B1 | 4/2001 | Hatoh et al. | |
| 7,323,269 B2 * | 1/2008 | Sugiura et al. | 429/465 |
| 2004/0157106 A1 | 8/2004 | Sugiura et al. | |
| 2005/0064268 A1 | 3/2005 | Cho et al. | |
| 2005/0250005 A1 | 11/2005 | Bacon et al. | |

FOREIGN PATENT DOCUMENTS

| | | |
|---|---|---|
| JP | 07-029580 A | 1/1995 |
| JP | 09-092324 A | 4/1997 |
| JP | 2000-067887 A | 3/2000 |
| JP | 2004-241208 A | 8/2004 |
| JP | 2004-362940 A | 12/2004 |
| JP | 2006-294366 A | 10/2006 |

OTHER PUBLICATIONS

International Search Report for International Application No. PCT/JP2008/001497, dated Sep. 22, 2008, 2 pages.
Extended European Search Report for European Application No. 08764092.6, dated Jan. 28, 2013, 7 pages.

* cited by examiner

*Primary Examiner* — Patrick Ryan
*Assistant Examiner* — Julian Anthony
(74) *Attorney, Agent, or Firm* — Brinks Hofer Gilson & Lione

(57) ABSTRACT

In a fuel cell stack, a cell stack formed by laminating a membrane electrode assembly and a separator and sandwiching them from the both sides in the laminating direction with a pair of end plates is fastened by being tightened in the laminating direction with a first plate spring. The first plate spring includes two arm sections for pressing the pair of end plates and a connecting section connecting the arm sections, and has a C-shaped cross-section.

5 Claims, 5 Drawing Sheets

FUEL CELL STACK AND FUEL CELL USING THE SAME

This application is a U.S. national phase application of PCT/JP2008/001497 filed on Jun. 12, 2008, which claims priority to JP 2007-159796 filed on Jun. 18, 2007.

TECHNICAL FIELD

The present invention relates to a fuel cell stack and a fuel cell using the same. More particularly, it relates to a structure for fastening a fuel cell stack.

BACKGROUND ART

Recently, with the rapid widespread of portable and cordless electronic devices, as driving power sources for such devices, small, lightweight and high energy density secondary batteries have been increasingly demanded. Furthermore, technology development has been accelerated in not only secondary batteries used for small consumer goods but also large secondary batteries for electric power storages and electric vehicles, which require long-time durability and safety. In addition, much attention has been paid to fuel cells enabling long-time continuous use with fuel supplied, rather than secondary batteries that need charging.

A fuel cell includes a fuel cell stack including a cell stack, a fuel supplying section for supplying fuel to the cell stack, and an oxidizing agent supplying section for supplying an oxidizing agent. The cell stack is formed by laminating a membrane electrode assembly that includes an anode electrode, a cathode electrode, and an electrolyte membrane interposed between the anode and cathode electrodes, and a separator onto each other, and disposing an endplate on each of the both end sides in the laminating direction. In the cell stack, it is necessary to laminate the anode electrode, the cathode electrode and the electrolyte membrane onto each other tightly, which is not only for allowing an electrochemical reaction to be carried out uniformly. The end plate and the separator are provided with groove for running the fuel and oxygen (air) as the oxidizing agent therein. Therefore, the anode electrode, the cathode electrode and the electrolyte membrane are laminated tightly in order to prevent fuel or oxygen from leaking out from a portion between the end plate or the separator and the anode electrode or the cathode electrode. In general, a cell stack is fastened as follows. Backing plates whose contact surface to the cell stack is larger than the cell stack are overlapped onto the both end sides of the laminated stack. Then, the entire periphery of protrusion of both backing plates is tightened by a plurality of pairs of a bolt and a nut (see, for example, Patent Document 1).

However, when the backing plates are tightened with bolts and nuts in this way, the fuel cell stack becomes larger with respect to the cell stack by a portion for assembling the bolts and nuts. Therefore, an occupied volume is increased when the fuel cell stack is used in small electronic devices. Furthermore, since backing plates are tightened with bolts and nuts outside the cell stack, the backing plates are warped, so that the fastening force in the center portion of the cell stack is reduced. When a thickness of the end plate is increased in order to prevent this, the fuel cell stack is further increased in size.

Patent Document 1: Japanese Patent Unexamined Publication No. 2006-294366

SUMMARY OF THE INVENTION

The present invention relates to a fuel cell stack having a small occupied volume and uniformly fastening a membrane electrode assembly, or a membrane electrode assembly, a separator and an end plate.

The fuel cell stack of the present invention includes a membrane electrode assembly, a pair of end plates, and a first plate spring. The membrane electrode assembly and the end plates form a unit cell of fuel cell. The membrane electrode assembly is formed by laminating an anode electrode, a cathode electrode, and an electrolyte membrane interposed between the anode and cathode electrodes. The end plates are disposed so as to sandwich the membrane electrode assembly from both sides in the laminating direction of the membrane electrode assembly. The first plate spring tightens the membrane electrode assembly and the end plates in the laminating direction. The first plate spring includes two arm sections for pressing the end plates and a connecting section for connecting the two arm sections so as to have a C-shaped cross-section. In this way, by fastening the unit cell of fuel cell using the first plate spring having a C-shaped cross-section, the fuel cell stack can be reduced in size as compared with the case where the fuel cell stack is fastened with bolts and nuts. Furthermore, the unit cell of fuel cell can be fastened uniformly in the planer direction of the membrane electrode assembly, as well as in the center portion. Thus, according to the present invention, the occupied volume of the fuel cell stack as a whole can be reduced and the unit cell of fuel cell can be fastened uniformly.

DETAILED DESCRIPTION OF THE PREFERRED EMBODIMENT

Hereinafter, the exemplary embodiments of the present invention are described with reference to drawings in which a direct methanol fuel cell (DMFC) is taken as an example. Note here that the present invention is not limited to the embodiments mentioned below as long as it is based on the basic features described in the description.

Exemplary Embodiment

Figure 1:
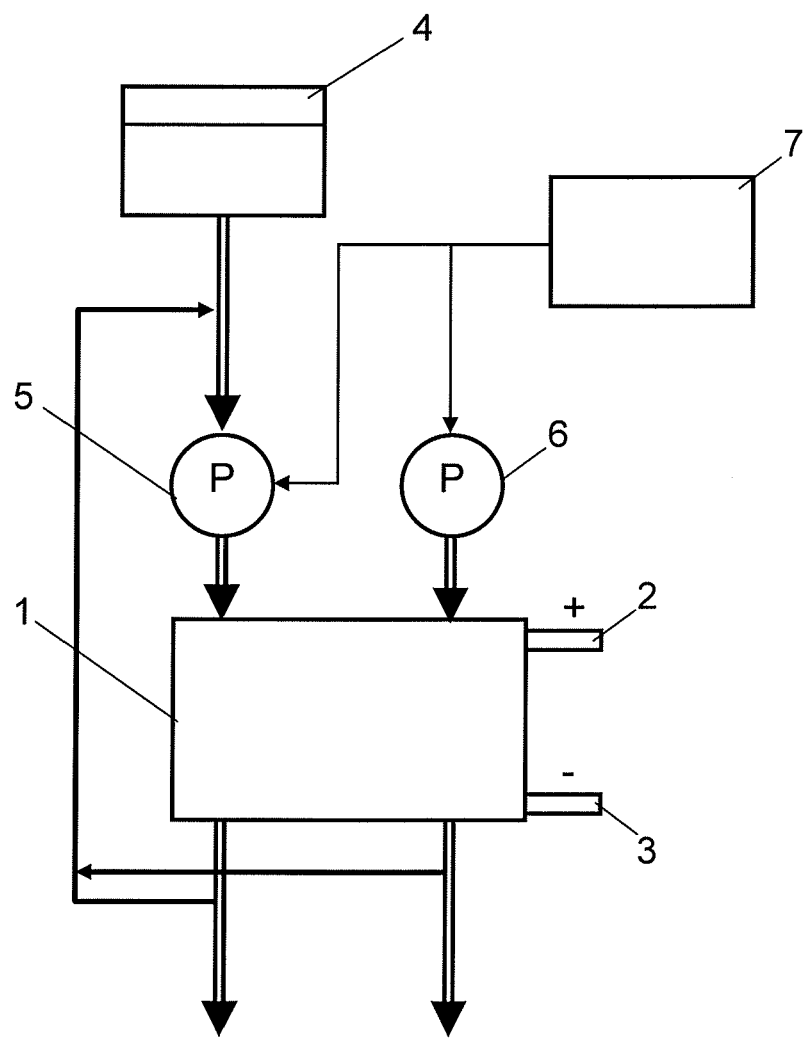
FIG. 1 is a block diagram showing a configuration of a fuel cell in accordance with an exemplary embodiment of the present invention.
Figure 2:
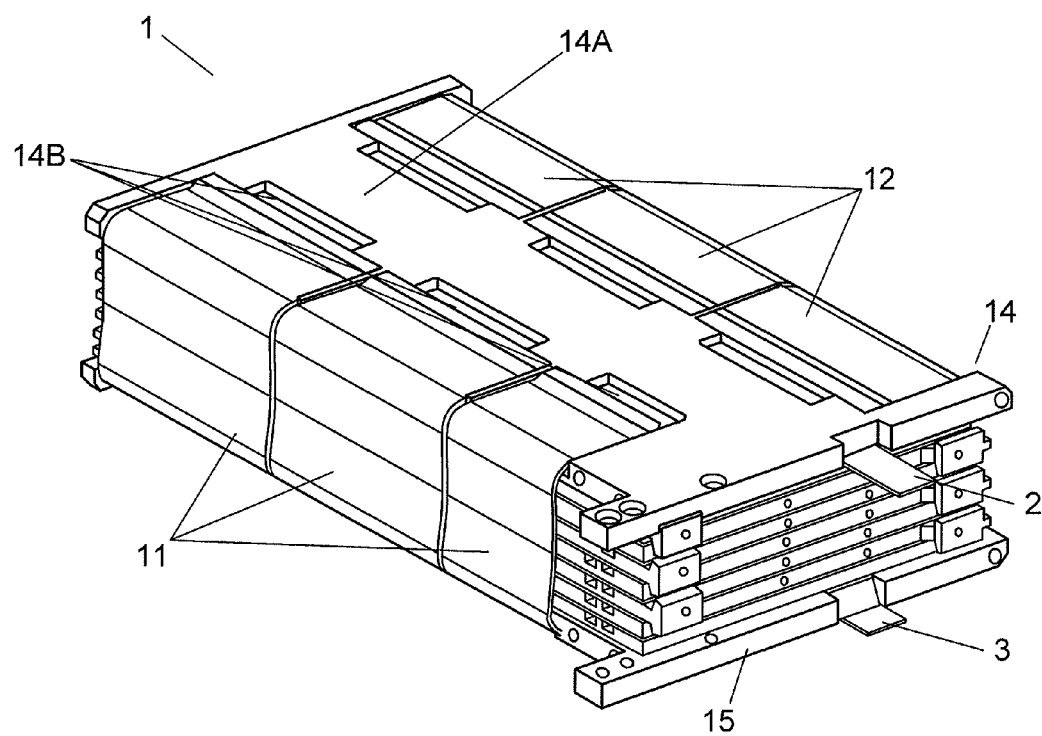
FIG. 2 is a perspective view showing a fuel cell stack in accordance with the exemplary embodiment of the present invention.
Figure 3:
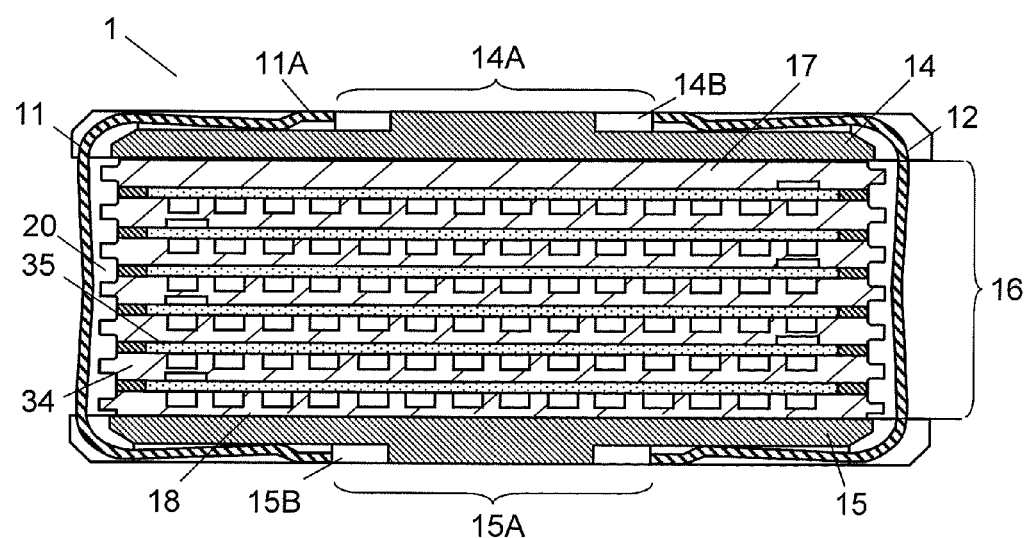
FIG. 3 is a sectional view of the fuel cell stack shown in FIG. 2.
Figure 4:
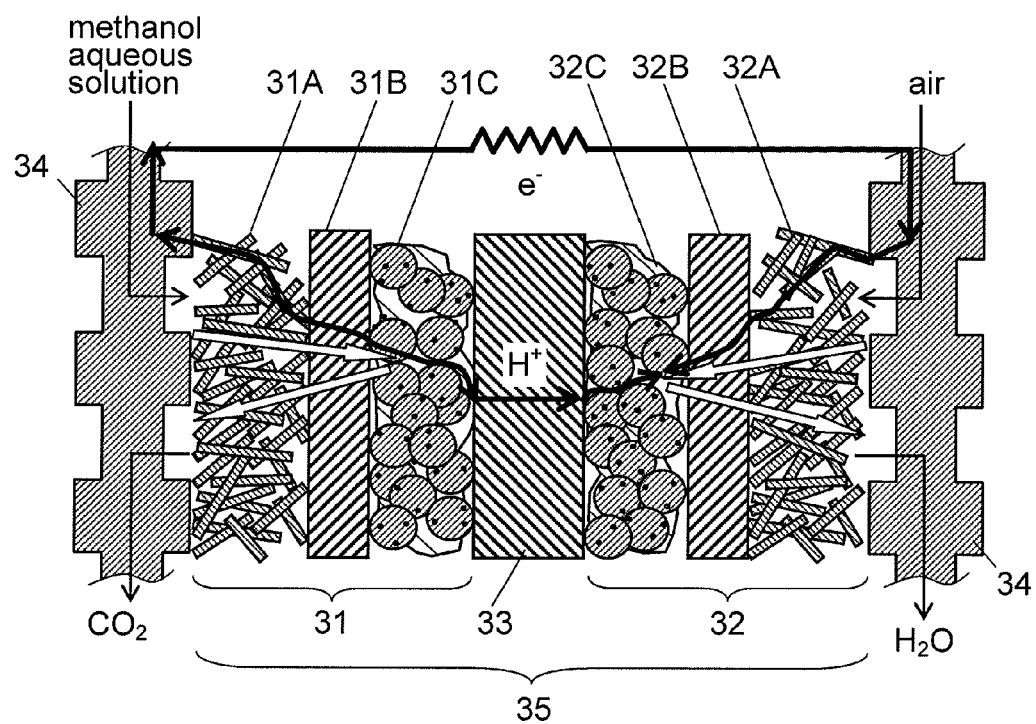
FIG. 4 is an enlarged sectional view showing a schematic configuration of a principal part of the fuel cell stack shown in FIG. 2.

FIG. 1 is a block diagram showing a configuration of a fuel cell in accordance with the exemplary embodiment of the present invention. FIGS. 2 and 3 are a perspective view and a sectional view showing a fuel cell stack in accordance with the exemplary embodiment of the present invention. FIG. 4 is an enlarged sectional view showing a schematic configuration of a principal part of the fuel cell stack.

The fuel cell includes fuel cell stack 1, fuel tank 4, fuel pump 5, air pump 6, and controller 7. Fuel cell stack 1 has an electricity generation section, and outputs the generated electric power from positive-electrode terminal 2 and negative-electrode terminal 3. Fuel pump 5 supplies fuel in fuel tank 4 to anode electrode 31 of fuel cell stack 1. Air pump 6 supplies an air as an oxidizing agent to cathode electrode 32 of fuel cell stack 1. Controller 7 supplies electric power to fuel pump 5 and air pump 6 so as to control their driving. That is to say, fuel tank 4, fuel pump 5 and controller 7 constitute a fuel supplying section that supplies fuel to anode electrode 31 in fuel cell stack 1. On the other hand, air pump 6 and controller 7 constitute an oxidizing agent supplying section for supplying an oxidizing agent to cathode electrode 32 in fuel cell stack 1. As shown in FIG. 4, anode electrode 31 is supplied with a methanol aqueous solution as fuel, and cathode electrode 32 is supplied with air. Note here that the configurations of the fuel supplying section and the oxidizing agent supplying section are not particularly limited to the above-mentioned configurations.

As shown in FIGS. 2 and 3, fuel cell stack 1 includes cell stack 16, backing plates 14 and 15, first plate spring 11 and second plate spring 12. Cell stack 16 includes membrane electrode assemblies (MEAs) 35 as the electricity generation section, separators 34 disposed so as to sandwich MEA 35, and a pair of end plates 17 and 18. End plates 17 and 18 sandwich MEAs 35 and separators 34 from both sides in the laminating direction of MEAs 35, that is, from both sides in the laminating direction of MEAs 35 and separators 34. As shown in FIG. 4, MEA 35 includes anode electrode 31, cathode electrode 32, and electrolyte membrane 33 interposed between anode electrode 31 and cathode electrode 32, which are laminated onto each other.

Anode electrode 31 includes diffusion layer 31A, microporous layer (MPL) 31B and catalyst layer 31C, which are laminated sequentially from the separator 34 side. Cathode electrode 32 also includes diffusion layer 32A, microporous layer (MPL) 32B and catalyst layer 32C, which are laminated sequentially from the separator 34 side. Positive-electrode terminal 2 is electrically connected to cathode electrode 32, and negative-electrode terminal 3 is electrically connected to anode electrode 31, respectively. Diffusion layers 31A and 32A are made of, for example, carbon paper, carbon felt, carbon cloth, and the like. MPL 31B and 32B are made of, for example, polytetrafluoroethylene, or a tetrafluoroethylene—hexafluoropropylene copolymer, and carbon. Catalyst layers 31C and 32C are formed by highly diffusing a catalyst such as platinum and ruthenium suitable for each electrode reaction onto a carbon surface and by binding this catalyst with a binder. Electrolyte membrane 33 is formed of an ion-exchange membrane for allowing a hydrogen ion to permeate, for example, a perfluorosulfonic acid—tetrafluoroethylene copolymer. End plates 17 and 18 and separator 34 are made of a carbon material or stainless steel, and are provided with groove for supplying fuel and/or air to anode electrode 31 and/or cathode electrode 32.

Backing plate 14 is disposed at the anode electrode 31 side in cell stack 16, and backing plate 15 is disposed at the cathode electrode 32 side. Backing plates 14 and 15 are made of insulating resin, ceramic, resin containing a glass fiber, a metal plate coated with an electrically-insulating membrane, or the like.

First plate spring 11 and second plate spring 12 tighten cell stack 16 with the spring elastic force thereof via backing plates 14 and 15. Second plate spring 12 is disposed so as to face first plate spring 11. First plate spring 11 and second plate spring 12 are made of, for example, a spring steel material.

Figure 5A:
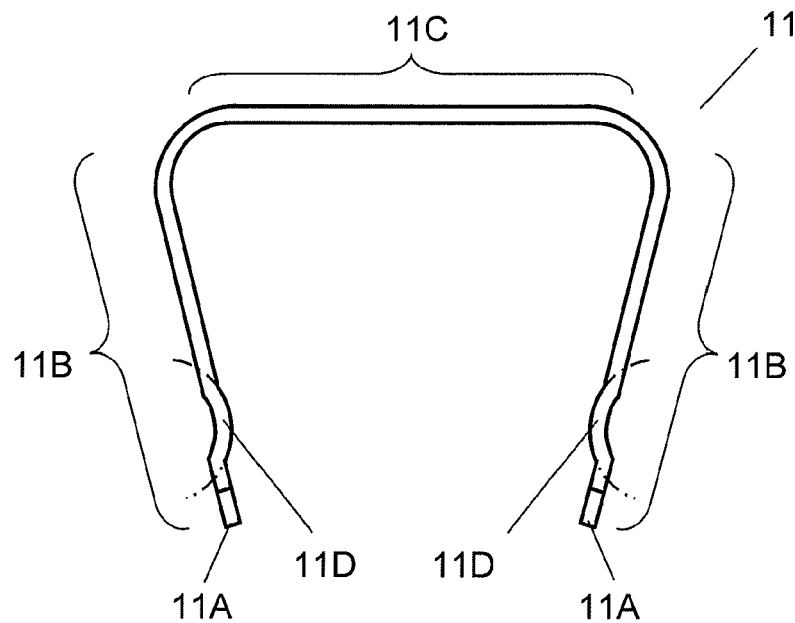
FIG. 5A is a side view showing a first plate spring used in the fuel cell stack shown in FIG. 2.

FIG. 5A is a side view showing first plate spring 11 used in fuel cell stack 1. First plate spring 11 includes two arm sections 11B for pressing cell stack 16 and connecting section 11C for connecting arm sections 11B, and has a C-shaped cross-section. Note here that since second plate spring 12 has the same shape as that of first plate spring 11, the description thereof is omitted.

Next, an operation in fuel cell stack 1 is briefly described. As shown in FIGS. 1 and 4, anode electrode 31 is supplied with an aqueous solution containing methanol by fuel pump 5. On the other hand, cathode electrode 32 is supplied with air pressurized by air pump 6. A methanol aqueous solution as a fuel supplied to anode electrode 31, and methanol and water vapor derived from the methanol aqueous solution are diffused in diffusion layer 31A to the entire surface of MPL 31B. Then, they pass through MPL 31B and reach catalyst layer 31C.

On the other hand, oxygen contained in the air supplied to cathode electrode 32 is diffused in diffusion layer 32A to the entire surface of MPL 32B. The oxygen further passes through MPL 32B and reaches catalyst layer 32C. Methanol that reaches catalyst layer 31C reacts as in formula (1), and oxygen that reaches catalyst layer 32C reacts as in formula (2).

$$CH_3OH+H_2O \rightarrow CO_2+6H^++6e- \tag{1}$$

$$3/2O_2+6H++6e- \rightarrow 3H_2O \tag{2}$$

As a result, electric power is generated, as well as carbon dioxide is generated at the anode electrode 31 side, and water is generated at the cathode electrode 32 side as reaction products, respectively. Carbon dioxide is exhausted to the outside of the fuel cell. Gases such as nitrogen that do not react in cathode electrode 32 and unreacted oxygen are also exhausted to the outside of the fuel cell. Note here that since not all methanol in the aqueous solution at the anode electrode 31 side react, the exhausted aqueous solution is generally allowed to return to fuel pump 5 as shown in FIG. 1. Furthermore, since water is consumed in the reaction in anode electrode 31, water generated in cathode electrode 32 may be allowed to return to the anode electrode 31 side as shown in FIG. 1.

In the exemplary embodiment, cell stack 16 is fastened by first plate spring 11 and second plate spring 12 via backing plates 14 and 15. First plate spring 11 and second plate spring 12 fasten cell stack 16 extremely compactly along the outer shape of cell stack 16 as shown in FIG. 3. That is to say, dead space is extremely small on the side surface of cell stack 16, and fuel cell stack 1 can be reduced in size as compared with a conventional case in which a cell stack is fastened by bolts and nuts.

Furthermore, in a conventional case in which a cell stack is fastened by using bolts and nuts, a pressing point is provided at the outside of the cell stack. However, first plate spring 11 and second plate spring 12 have a pressing point in a relatively central portion in cell stack 16. Therefore, pressing power is operated in cell stack 16 uniformly in the planar direction of backing plates 14 and 15. With such a pressing power, entire cell stack 16 can be fastened uniformly. Thus, the electrochemical reactions expressed by the formulae (1) and (2) proceed uniformly in the planar direction of MEA 35. As a result, current-voltage characteristics of fuel cell stack 1 are improved.

As shown in FIG. 5A, it is preferable that first plate spring 11 has convex portions 11D protruding to the inner side of the C-shaped cross-section in arm sections 11B, respectively. When cell stack 16 is pressed by convex portions 11D from both sides in the laminating direction of cell stack 16, a pressing point is determined as compared with the case in which cell stack 16 is pressed by the entire surface of arm sections 11B, and therefore cell stack 16 can be fastened stably. Furthermore, variation of the pressing power can be reduced as compared with the case in which cell stack 16 is pressed by a tip of arm section 11B. The shape of convex portion 11D has preferably a cylindrical surface as shown in FIG. 5A. Thus, workability of fitting first plate spring 11 can be improved.

Specifically, when the length in the laminating direction of cell stack 16 is 19.1 mm, and the thickness of backing plates 14 and 15 is 1.5 mm, first plate spring 11 and second plate spring 12 are formed by using a spring steel material having a thickness of 0.5 mm. When the bend elastic modulus thereof is made to be 206,000 MPa, pressing power of 0.21 MPa in average can be applied to MEA 35. Furthermore, variation of pressure in the planer direction of MEA 35 is not more than 4%. In cell stack 16 having such a configuration, it is experimentally shown that when the pressuring power of MEA 35 is not less than 0.15 MPa, electric power generation property is not lowered. Therefore, when such first plate spring 11 and second plate spring 12 are used, a necessary pressing power can be secured.

Figure 5B:
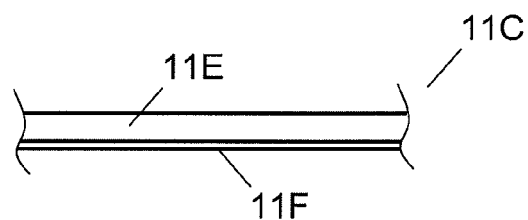
FIG. 5B is an enlarged view showing a connecting section of the first plate spring shown in FIG. 5A.
Figure 5C:
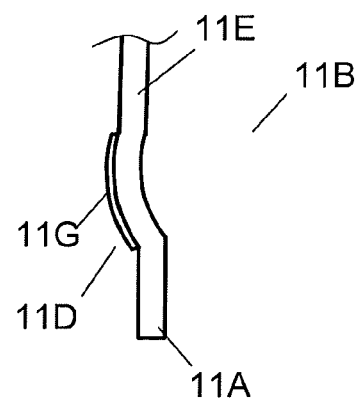
FIG. 5C is an enlarged view showing an arm section of the first plate spring shown in FIG. 5A.

Next, preferable embodiments of first plate spring 11 and second plate spring 12 are described with reference to FIGS. 5A to 5C. FIG. 5B is an enlarged view showing connecting section 11C of first plate spring 11. FIG. 5C is an enlarged view showing arm section 11B of first plate spring 11. As previously mentioned, since second plate spring 12 has the same structure as first plate spring 11, herein, first plate spring 11 is described as a representative example.

As shown in FIG. 5A, it is preferable that connecting section 11C of first plate spring 11 has a planar shape in a state in which first plate spring 11 is removed from backing plates 14 and 15. That is to say, it is preferable that in the initial state in which the shape of first plate spring 11 is changed, connecting section 11C has a planar shape. In general, a connecting section of a plate spring having a C-shaped cross-section is curved in a release state so that it can be easily bent when it is fitted. On the contrary, in the exemplary embodiment, connecting section 11C has a planar shape in a state in which it is removed from cell stack 16 and backing plates 14 and 15. First plate spring 11 having such a shape can be manufactured easily. Furthermore, when first plate spring 11 is fitted into backing plates 14 and 15, protrusion of connecting section 11C to the inner side is reduced. As a result, the dimension of a curved portion between connecting section 11C and arm section 11B protruding to the outside is reduced. Therefore, the occupied volume of fuel cell stack 1 can be further reduced.

Furthermore, as shown in FIG. 5B, it is preferable that insulating layer 11F is provided on spring material 11E in at least connecting section 11C at the inner side of the C-shaped cross-section of first plate spring 11. When displacement force is applied to cell stack 16 in the direction different from the laminating direction, cell stack 16 is displaced from backing plates 14 and 15, and brought into contact with first plate spring 11, thus causing a short circuit inside cell stack 16. In response to this, as mentioned above, by providing insulating layer 11F, such a short circuit can be prevented.

Furthermore, as shown in FIG. 5C, it is preferable that sliding layer 11G is provided on at least arm section 11B at the inner side of the C-shaped cross-section of first plate spring 11. The friction between sliding layer 11G and backing plates 14 and 15 is smaller than the friction between spring material 11E constituting first plate spring 11 and backing plates 14 and 15. When convex portion 11D is provided as shown in FIG. 5C, sliding layer 11G may be provided on at least convex portion 11D. When sliding layer 11G is provided in this way, the workability in fitting first plate spring 11 into cell stack 16 is improved. Furthermore, the position of first plate spring 11 can be finely adjusted more easily after first plate spring 11 is fitted.

Figure 6:
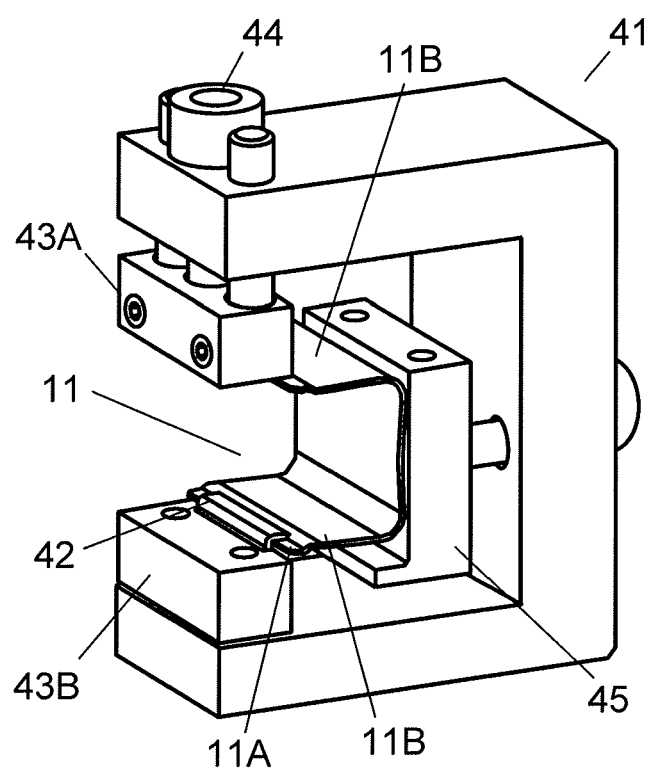
FIG. 6 is a perspective view showing a jig for fitting the first plate spring and a second plate spring into the fuel cell stack in accordance with the exemplary embodiment of the present invention.

Next, with reference to FIG. 6, a procedure for fitting first plate spring 11 and second plate spring 12 into cell stack 16 sandwiched between backing plates 14 and 15 is described. FIG. 6 is a perspective view showing a jig for fitting first plate spring 11 and second plate spring 12 into cell stack 16. Also herein, only a procedure of fitting first plate spring 11 is described as a representative example.

Jig 41 includes claw 42, holders 43A and 43B each having claw 42, driving section 44 for moving holder 43A in the vertical direction, and supporter 45. Firstly, driving section 44 allows holder 43A to move down. First plate spring 11 is mounted on supporter 45 in a manner that tip 11A of first plate spring 11 is hooked on two claws 42. Next, driving section 44 allows holder 43A to lift up so as to widen between arm sections 11B of first plate spring 11.

Meanwhile, cell stack 16 sandwiched between backing plates 14 and 15 is compressed. Since diffusion layers 31A and 32A are formed of bulky materials such as carbon paper, when they are compressed, separator 34 is brought into close contact with MEA 35. In this state, first plate spring 11 is allowed to cover cell stack 16 sandwiched between backing plates 14 and 15 from the arm sections 11B side using jig 41. Then, when driving section 44 allows holder 43A to move down, arm sections 11B are brought into contact with backing plates 14 and 15, respectively. Thus, first plate spring 11 can be fitted into cell stack 16 sandwiched between backing plates 14 and 15. This work can be carried out for a relatively short time as compared with a conventional fastening work using bolts and nuts. Furthermore, variation of pressing power due to variation of tightening of bolts is not generated.

Note here that it is preferable that tip 11A of arm section 11B of first plate spring 11 is formed so that tip 11A is apart from backing plates 14 and 15 when first plate spring 11 is mounted. By using first plate spring 11 having such a shape, tip 11A is easily removed from claw 42 when arm sections 11B are brought into contact with backing plates 14 and 15, respectively. Thus, workability is improved.

Furthermore, as shown in FIGS. 2 and 3, it is preferable that backing plates 14 and 15 have protrusions 14A and 15A protruding to the outside of laminating direction of MEA 35 and end plates 17 and 18 in cell stack 16, respectively. Then, it is preferable that tips 11A of first plate spring 11 are brought into contact with protrusions 14A and 15A. When first plate spring 11 is fitted into cell stack 16, by bringing tip 11A of first plate spring 11 into contact with protrusions 14A and 15A provided on backing plates 14 and 15, the position in which first plate spring 11 is fitted into cell stack 16 can be made stable. In particular, when arm section 11B is provided with convex portion 11D, convex portion 11D can be disposed on an appropriate pressing position reliably by appropriately designing the dimensions of protrusions 14A and 15A provided on backing plates 14 and 15 and the dimension from tip 11A to convex portion 11D.

Furthermore, as shown in FIGS. 2 and 3, it is preferable that protrusions 14A and 15A provided on backing plates 14 and 15 include notch portion 14B and 15B, respectively. Notch portions 14B and 15B extend in the second direction perpendicular to the first direction in which first plate spring 11 and second plate spring 12 face each other, and they are disposed in parallel on protrusions 14A and 15A. When protrusions 14A and 15A are provided with notch portions 14B and 15B, holders 43A and 43B can be accommodated in notch portions 14B and 15B. Therefore, workability of fitting first plate spring 11 and second plate spring 12 into cell stack 16 can be improved.

It is preferable that space 20 is provided between connecting section 11C of first plate spring 11 and cell stack 16 including MEAs 35 and end plates 17 and 18. Space 20 can be used as an air duct for cooling cell stack 16.

Note here that in the above description, cell stack 16 is formed by using a plurality of MEAs 35, disposing separators 34 between MAEs 35, disposing end plates 17 and 18 in the both sides in the laminating direction, and further disposing backing plates 14 and 15 on the outside of the end plates 17 and 18. However, the present invention is not necessarily limited to this configuration. A single MEA 35 is sandwiched between end plates 17 and 18 from the both sides in the laminating direction of MEA 35. MEA 35 and end plates 17 and 18 may be tightened in the laminating direction by only using first plate spring 11. In this case, it is preferable that first plate spring 11 is formed so that it presses the vicinity of the center portion of end plates 17 and 18. Needless to say, in this configuration, second plate spring 12 may be used. Furthermore, in FIG. 2, a plurality of first plate springs 11 and second plate springs 12 are used. However, depending upon the size of cell stack 16, one each of first plate spring 11 and second plate spring 12 may be used. Thus, a single cell may be pressed or a cell stack may be pressed. One or plurality of plate springs, and one pair or plural pairs of plate springs may be used.

However, when second plate spring 12 is used in addition to first plate spring 11, a unit cell of fuel cell or a cell stack can be fastened uniformly in the planer direction of MEA 35 reliably without considerably increasing the size of fuel cell stack 1.

Furthermore, it is preferable that backing plates 14 and 15 are provided and that backing plates 14 and 15 are formed of a material that is different from that of end plates 17 and 18. Thus, backing plates 14 and 15 directly receiving a pressing power of first plate spring 11, and end plates 17 and 18 also functioning as a flow passage of fuel and an oxidizing agent can be optimized. For example, when backing plates 14 and 15 are formed of a material that is more rigid than that of end plates 17 and 18, it is possible to suppress the deformation of backing plates 14 and 15 due to pressing power of first plate spring 11. As a result, the unit cell of fuel cell or the cell stack can be fastened more uniformly in the planer direction of MEA 35. Furthermore, when backing plates 14 and 15 are formed of an electrically-insulating material, it is not necessary to consider the short circuit by arm section 11B of first plate spring 11.

Furthermore, when backing plates 14 and 15 are not used, an electrically-insulating membrane is formed at the inner side of the C-shaped cross section of first plate spring 11 (and second plate spring 12) so that short circuit due to first plate spring 11 does not occur. That is to say, backing plates 14 and 15 are not essential. When backing plates 14 and 15 are not used, it is preferable that end plates 17 and 18 include protrusions corresponding to protrusions 14A and 15A and notch portions corresponding to notch portions 14B and 15B. Furthermore, it is preferable that a sliding layer whose friction with end plates 17 and 18 is smaller than that of spring material 11E constituting first plate spring 11 with end plates 17 and 18 is provided on at least arm sections 11B at the inner side of the C-shaped cross section of first plate spring 11 (and second plate spring 12). This sliding layer corresponds to sliding layer 11G. Furthermore, it is preferable that tip 11A of arm section 11B of first plate spring 11 (and second plate spring 12) is apart from end plates 17 and 18.

In the exemplary embodiment, DMFC is described as an example. However, the configuration of the present invention can be applied to any fuel cells using a power generation element that is the same as cell stack 16. For example, it may be applied to a so-called polymer solid electrolyte fuel cell and a methanol modified fuel cell, which use hydrogen as fuel.

Furthermore, the configuration of the present invention may be applied to a laminated body formed by laminating elements that form a primary battery as a power generating element or a secondary battery or capacitor as a storage element. Furthermore, it is useful for a laminated stack formed by laminating unit power generating elements or unit storage elements.

INDUSTRIAL APPLICABILITY

In a fuel cell stack and a fuel cell using the fuel cell stack according to the present invention, a unit cell of fuel cell or a cell stack is fastened by a plate spring. With such a simple configuration, it is possible to form the fuel cell stack compactly, and it is possible to fasten a membrane electrode assembly, or a membrane electrode assembly, a separator and end plates uniformly. Such a fuel cell stack and the fuel cell using the fuel cell stack are particularly useful as a power source of small electronic devices.

The invention claimed is:

1. A fuel cell stack comprising:
   a membrane electrode assembly including an anode electrode, a cathode electrode, an electrolyte membrane interposed between the anode electrode and the cathode electrode, which are laminated onto each other;
   a pair of end plates sandwiching the membrane electrode assembly from both sides in a laminating direction of the membrane electrode assembly; and
   a pair of backing plates at an outside of the end plates in a laminating direction of the membrane electrode assembly and the end plates, and
   a first plate spring tightening the membrane electrode assembly and the end plates in the laminating direction, the first plate spring including two arm sections for pressing the end plates and a connecting section connecting the two arm sections so as to have a C-shaped cross-section;
   wherein a tip of each of the arm sections of the first plate spring is apart from the backing plates.

2. A fuel cell stack comprising:
   a membrane electrode assembly including an anode electrode, a cathode electrode, an electrolyte membrane interposed between the anode electrode and the cathode electrode, which are laminated onto each other;

a pair of end plates sandwiching the membrane electrode assembly from both sides in a laminating direction of the membrane electrode assembly;

a pair of backing plates at an outside of the end plates in a laminating direction of the membrane electrode assembly and the end plates; and a first plate spring tightening the membrane electrode assembly, the end plates and the backing plates in the laminating direction, the first plate spring including two arm sections for pressing the end plates via the backing plates, and a connecting section connecting the two arm sections so as to have a C-shaped cross-section, wherein each of the backing plates has a protrusion protruding to the outside in the laminating direction of the membrane electrode assembly and the end plates, and a tip of each of the arm sections of the first plate spring is brought into contact with the protrusion.

3. The fuel cell stack according to claim 2, wherein the protrusion is provided with a notch portion.

4. A fuel cell stack comprising:

a membrane electrode assembly including an anode electrode, a cathode electrode, an electrolyte membrane interposed between the anode electrode and the cathode electrode, which are laminated onto each other;

a pair of end plates sandwiching the membrane electrode assembly from both sides in a laminating direction of the membrane electrode assembly;

a pair of backing plates at an outside of the end plates in a laminating direction of the membrane electrode assembly and the end plates; and a first plate spring tightening the membrane electrode assembly, the end plates and the backing plates in the laminating direction, the first plate spring including two arm sections for pressing the end plates via the backing plates, and a connecting section connecting the two arm sections so as to have a C-shaped cross-section, wherein at least the connection section at an inner side of the C-shaped cross-section of the first plate spring includes an electrically-insulating layer thereon.

5. A fuel cell stack comprising:

a membrane electrode assembly including an anode electrode, a cathode electrode, an electrolyte membrane interposed between the anode electrode and the cathode electrode, which are laminated onto each other;

a pair of end plates sandwiching the membrane electrode assembly from both sides in a laminating direction of the membrane electrode assembly;

a pair of backing plates at an outside of the end plates in a laminating direction of the membrane electrode assembly and the end plates; and a first plate spring tightening the membrane electrode assembly, the end plates and the backing plates in the laminating direction, the first plate spring including two arm sections for pressing the end plates via the backing plates, and a connecting section connecting the two arm sections so as to have a C-shaped cross-section, wherein at least each of the arm sections at the inner side of the C-shaped cross-section of the first plate spring is provided with a sliding layer whose friction against one of the backing plates is smaller than friction of a spring material forming the first plate spring against the one of the backing plates.

* * * * *